US00RE46663E

(19) United States
(12) Reissued Patent
Nelson et al.

(10) Patent Number: US RE46,663 E
(45) Date of Reissued Patent: *Jan. 9, 2018

(54) SYSTEM AND METHOD FOR PARTITIONING CARGO AREAS

(75) Inventors: Roger Nelson, Rice Lake, WI (US); Chad Nelson, Rice Lake, WI (US)

(73) Assignee: FG Products, Inc., Rice Lake, WI (US)

( * ) Notice: This patent is subject to a terminal disclaimer.

(21) Appl. No.: 13/453,378

(22) Filed: Apr. 23, 2012

Related U.S. Patent Documents

Reissue of:
(64) Patent No.: 7,607,874
Issued: Oct. 27, 2009
Appl. No.: 12/250,219
Filed: Oct. 13, 2008

U.S. Applications:
(60) Division of application No. 13/248,396, filed on Sep. 29, 2011, which is an application for the reissue of
(Continued)

(51) Int. Cl.
*B60P 7/08* (2006.01)
*B60P 3/20* (2006.01)
*B61D 17/04* (2006.01)

(52) U.S. Cl.
CPC ..... *B60P 3/205* (2013.01); *B61D 17/048* (2013.01)

(58) Field of Classification Search
USPC ..... 410/121, 129–131, 135, 140; 296/24.4, 296/24.41; 220/529–531, 534, 543, 544,
(Continued)

(56) References Cited

U.S. PATENT DOCUMENTS 723,231 A 3/1903 Benedict
1,061,974 A 5/1913 Bohn
(Continued)

FOREIGN PATENT DOCUMENTS

DE 298 20 764 2/1999
EP 0 252 707 1/1988
(Continued)

OTHER PUBLICATIONS

Advertisement for "The Loadmaker by ROM", Refrigerated Transporter, Feb. 1987, p. 49. ("ROM Ad No. 1").*
(Continued)

*Primary Examiner* — Cary E. Wehner
(74) *Attorney, Agent, or Firm* — Gardella Grace P.A.

(57) ABSTRACT

An improved bulkhead and partition system in which at least two panels are independently attached to mounting members such that each panel can be moved independently. In a preferred embodiment, two bulkheads or panels are slidably attached to separate pairs of ceiling-mounted rails in a refrigerated trailer such that each bulkhead or panel can be independently slid toward the front of a trailer or toward the rear of a trailer to define, in cooperation with a removable center partition wall, a plurality of different cargo areas to be maintained at different temperatures. Alternatively, two bulkheads or panels may advantageously operate without a partition wall such that the panels may be placed side-by-side and fastened together to make a full-width bulkhead.

35 Claims, 7 Drawing Sheets

Related U.S. Application Data

Pat. No. 7,607,874, which is a continuation of application No. 11/938,124, filed on Nov. 9, 2007, now Pat. No. 7,445,412, which is a continuation of application No. 11/693,292, filed on Mar. 29, 2007, now Pat. No. 7,338,239, which is a continuation of application No. 11/083,041, filed on Mar. 17, 2005, now Pat. No. 7,214,017, which is a division of application No. 10/638,268, filed on Aug. 7, 2003, now Pat. No. 6,923,610, which is a continuation of application No. 09/909,484, filed on Jul. 20, 2001, now Pat. No. 6,626,625.

(60) Provisional application No. 60/219,534, filed on Jul. 20, 2000.

(58) Field of Classification Search
USPC ..... 220/552; 221/529–531, 534, 543, 544, 221/552
See application file for complete search history.

(56) References Cited

U.S. PATENT DOCUMENTS

| | | | | |
|---|---|---|---|---|
| 1,193,255 | A | 8/1916 | Gibbs | |
| 1,896,198 | A | 2/1933 | MacMillan | |
| 1,970,610 | A | 8/1934 | McMullen et al. | |
| 2,324,721 | A | 7/1943 | O'Connor | |
| 2,346,853 | A | 4/1944 | Lundvall | |
| 2,752,864 | A | 7/1956 | McDougal, Sr. et al. | |
| 2,866,419 | A | 12/1958 | Candlin, Jr. | |
| 2,895,431 | A | 7/1959 | Ford | |
| 3,017,843 | A | 1/1962 | Loomis et al. | |
| 3,057,284 | A | 10/1962 | Learmont | |
| 3,070,044 | A | 12/1962 | Tobin | |
| 3,162,146 | A | 12/1964 | Knippel et al. | |
| 3,217,664 | A | 11/1965 | Aquino et al. | |
| 3,413,932 | A | 12/1968 | Bennett | |
| 3,438,149 | A | 4/1969 | Ilg | |
| 3,680,492 | A | 8/1972 | Weage | |
| 4,019,442 | A | 4/1977 | Lee et al. | |
| 4,049,311 | A | 9/1977 | Dietrich et al. | |
| 4,265,577 | A | 5/1981 | Loomis | |
| 4,281,870 | A | 8/1981 | Ehrlich et al. | |
| 4,639,031 | A | 1/1987 | Truckenbrodt | |
| 4,880,342 | A | 11/1989 | Pradovic | |
| 4,886,404 | A | 12/1989 | Jensen et al. | |
| 5,010,943 | A | 4/1991 | Boyer | |
| 5,054,295 | A | 10/1991 | Goulooze | |
| 5,129,235 | A | 7/1992 | Renken et al. | |
| 5,161,848 | A | 11/1992 | Lutton | |
| 5,265,993 | A | 11/1993 | Wayne | |
| 5,664,386 | A | 9/1997 | Palmersten | |
| 5,704,676 | A | 1/1998 | Hill | |
| 5,984,601 | A | 11/1999 | Jevaney et al. | |
| 6,017,175 | A | 1/2000 | Kassab et al. | |
| 6,247,740 | B1 | 6/2001 | Smith | |
| 6,626,625 | B2 | 9/2003 | Nelson et al. | |
| 6,857,834 | B2 | 2/2005 | Nelson et al. | |
| 6,923,610 | B2 | 8/2005 | Nelson et al. | |
| 7,195,435 | B2 | 3/2007 | Clark | |
| 7,214,017 | B2 | 5/2007 | Nelson et al. | |
| 7,300,236 | B2 | 11/2007 | Nelson et al. | |
| 7,338,239 | B2 | 3/2008 | Nelson et al. | |
| 7,445,412 | B2 * | 11/2008 | Nelson et al. | 410/130 |
| 7,600,955 | B2 | 10/2009 | Nelson et al. | |
| 7,607,874 | B2 | 10/2009 | Nelson et al. | |

FOREIGN PATENT DOCUMENTS

| | | |
|---|---|---|
| EP | 0 366 272 | 5/1990 |
| EP | 0 967 116 | 12/1999 |
| GB | 2238988 | 6/1991 |

OTHER PUBLICATIONS

Reexamination No. 95/000,326, Brief of Appellant Randall Mfg, with addendum, filed Dec. 21, 2012, in Court of Appeals, Docket No. 12-1611, pp. 1-105.
U.S. Appl. No. 95/000,326, filed Dec. 4, 2007, Nelson, et al.
U.S. Appl. No. 13/453,722, filed Apr. 23, 2012, Nelson, et al.
Reexamination No. 95/000,326, Decision issued Oct. 30, 2013, in United States Court of Appeals for the Federal Circuit, Case No. 12-1611, pp. 1-15.
Trade Literature describing Randall Bulkhead Systems believed to have been offered for sale prior to Jul. 20, 2001.
Trade Literature describing Tempar Bulkhead Systems believed to have been offered for sale prior to Jul. 20, 2001.
Trade Literature describing ROM Bulkhead Systems believed to have been offered for sale prior to Jul. 20, 2001.
Trade Literature describing Bulkhead Seals believed to have been offered for sale prior to Jul. 20, 2001.
Trade Literature describing Donovan Bulkhead Systems believed to have been offered for sale prior to Jul. 20, 2001.
Trade Literature describing FG Products Bulkhead Systems believed to have been offered for sale prior to Jul. 20, 2001.
Trade Literature describing ISOWALL Insulation Partition Walls believed to have been offered for sale prior to Jul. 20, 2001.
Trade Literature describing LOAD-LOK Cargo Restraint Systems believed to have been offered for sale prior to Jul. 20, 2001.
Trade Literature describing Schmitz Cargobull Bulkhead Systems believed to have been offered to sale prior to Jul. 20, 2001.
Information Disclosure Statement filed by Third Party Requester, May 27, 2008, 3 pages (023RX1).
Advertisement for "Floater II Insulation Bulkhead" by F/G Products, Refrigerated Transporter, Feb. 1995, p. 57.
Advertisement for Flex-Lite: and "Floater II" by F/G Products, Refrigerated Transporter, Jun. 1996, p. 65.
Advertisement for "The Loadmaker by ROM" Refrigerated Transporter, Feb. 1987, p. 49.
Advertisement for "The Tough One" by Randall Industries, Refrigerated Transport, Dec. 1994, p. 25.
Moveable Bulkheads for Multi-Temperature Service:, Refrigerated Transport, Nov. 1978, pp. 93-95.
Tesco Turns Inventory From Vendors to Store Shelves on a 30-Hour Cycle, Refrigerated Transport Jan. 1997 p. 12-13.
Advertisement for "Insulated Products" by Donovan, Refrigerated Transport, Apr. 1997, p. 27.

* cited by examiner

SYSTEM AND METHOD FOR PARTITIONING CARGO AREAS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 7,607,874. The reissue application numbers are: reissue application Ser. No. 13/248,396, divisional reissue application Ser. No. 13/453,378 (the present application) and divisional reissue application Ser. No. 14/882,156.*

CROSS-REFERENCE TO RELATED APPLICATIONS

This application is a *divisional reissue application of U.S. application Ser. No. 13/248,396, now abandoned. U.S. application Ser. No. 13/248,396 was a reissue application of U.S. Pat. No. 7,607,874, which issued on Oct. 27, 2009. U.S. Pat. No. 7,607,874 was filed as U.S. application Ser. No. 12/250,219 on Oct. 13, 2008. U.S. application Ser. No. 12/250,219 is a* continuation of U.S. application Ser. No. 11/938,124, filed on Nov. 9, 2007 by Nelson et al., now U.S. Pat. No. 7,445,412, which is a continuation of U.S. application Ser. No. 11/693,292, filed on Mar. 29, 2007 by Nelson et al., now U.S. Pat. No. 7,338,239, which is a continuation of U.S. application Ser. No. 11/083,041, filed on Mar. 17, 2005 by Nelson et al., now U.S. Pat. No. 7,214,017, which is a divisional of U.S. application Ser. No. 10/638,268, filed on Aug. 7, 2003 by Nelson et al., now U.S. Pat. No. 6,923,610, which is a continuation of U.S. application Ser. No. 09/909,484, filed on Jul. 20, 2001 by Nelson et al., now U.S. Pat. No. 6,626,625, which claims benefit to provisional patent application Ser. No. 60/219,534, filed on Jul. 20, 2000 by Nelson et al., the complete disclosures of which are incorporated herein by reference.

TECHNICAL FIELD

The present invention relates to movable partitions and panels, and, more particularly, to partitions and bulkheads which can be used to separate or insulate cargo during transportation or storage. The invention also relates to segregation of cargo into a plurality of areas that are maintained at different temperatures, commonly known as multi-temperature transport.

BACKGROUND

Perishable items such as produce and meat are often transported in refrigerated trailers, railcars, or ocean-going containers that can be transported on ships, trains or trucks. Such cargo transport devices are typically equipped with a refrigeration unit which conditions the air inside the cargo space, thereby maintaining desired temperatures and humidities during transportation or storage. Refrigerated trailers, railcars and containers are typically configured so as to enclose a single, large cargo space. Their refrigeration units will accordingly maintain the entire cargo space at the same temperature and humidity unless the cargo area is somehow divided. However, when the perishable cargo does not fill the entire trailer, cooling the entire cargo area is unnecessary and costly. It causes unnecessary strain and wear on the refrigeration unit, increases fuel consumption, raises transportation costs, and lengthens the time necessary to cool the perishable cargo after any temperature aberration.

Movable partitions and bulkheads having a specialized construction which permits the cargo space of trailers, rail cars, and containers to be readily divided into sections of varying sizes are known. Such bulkheads and partitions have been widely used to separate cargo areas for multi-temperature transport. The structure and configuration of partition and bulkhead systems differ somewhat depending on whether they are being deployed in a trailer, railcar, or container. Partitions currently used in refrigerated truck trailers typically extend from floor to ceiling and are generally comprised of modular wall sections. The modular sections are often mounted in channels or grooves on the trailer floor, held in place by friction, or otherwise mechanically fastened in place so as to compartmentalize trailers and truck bodies for multi-temperature food distribution. The panels are used to divide the trailer or body both longitudinally, along the long axis of the trailer, and laterally, across the width of the trailer. Some partition systems include panels that can be readily removed and placed along the sidewall of the trailer when not in use.

Insulated bulkheads are panels that extend across the width of a trailer to form separate fore and aft cargo areas. Like partitions, insulated bulkheads allow a refrigerated hauler to carry two or more loads at different temperatures within the same trailer or cargo container. For instance, bulkheads may be used to separate fresh food products from frozen or dry goods. Bulkheads are optionally equipped with walk-through doors similar to those used in partitions to permit ingress to and egress from each conditioned cargo area. Due to the functional similarities between bulkheads and panels, the latter are sometimes referred to as bulkheads.

SUMMARY

The present invention includes an improved partition system in which at least two panels are independently attached to one or more mounting assemblies such that each panel can be moved independently. In a preferred embodiment, two bulkheads or panels are slidably attached to separate pairs of ceiling-mounted rails in a refrigerated trailer such that each bulkhead or panel can be independently slid toward the front of a trailer or toward the rear of a trailer to define, in cooperation with a removable center partition wall, a plurality of different cargo areas to be maintained at different temperatures. In another preferred embodiment, two panels in the form of half-width bulkheads are releasably secured to one another and independently, slidably attached to ceiling of the trailer such that each half-width bulkhead can be independently raised and lowered with a minimum of fore and aft clearance.

BRIEF DESCRIPTION OF THE DRAWINGS

Like reference numbers and designations in the various drawings indicate like elements.

DETAILED DESCRIPTION OF PREFERRED EMBODIMENTS

Figure 1:
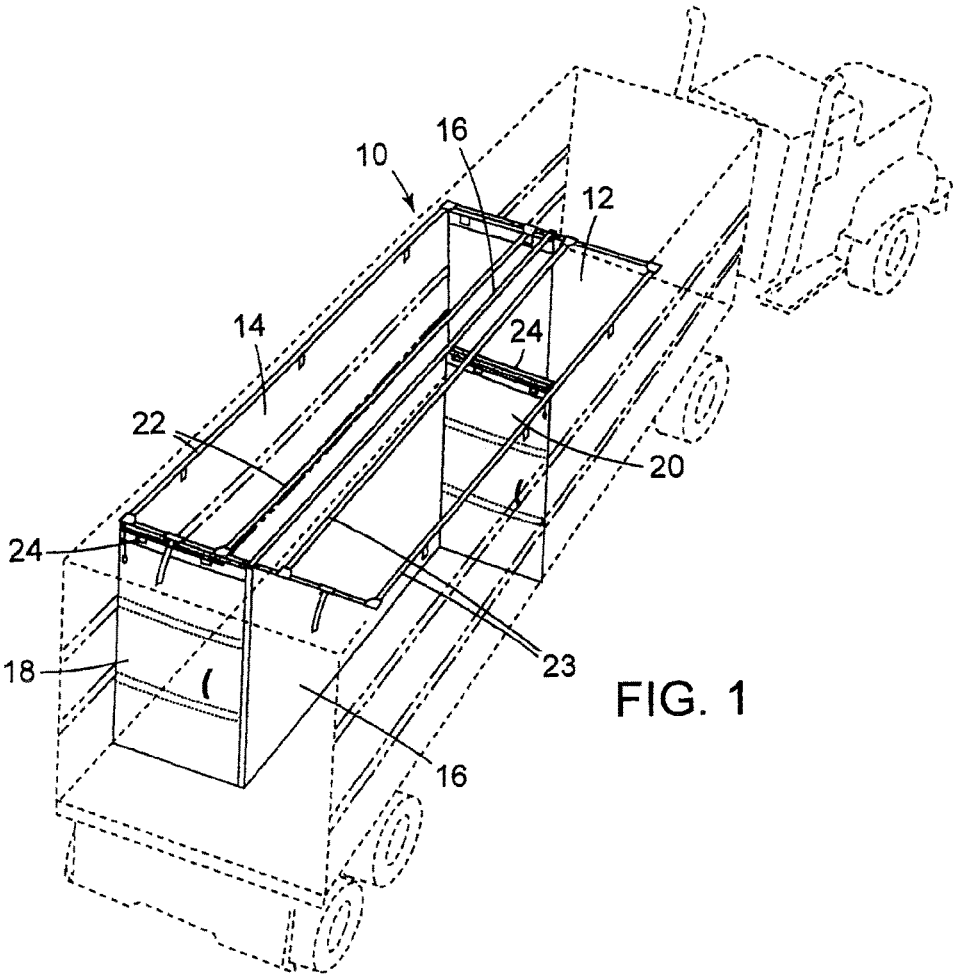
FIG. 1 is a perspective view of a trailer containing center partition panels extending along the long axis of the trailer, two horizontal panels, and a rail and trolley system for moving the horizontal panel in the axial direction.

Referring to FIG. 1, the trailer 10 encloses a cargo space. The cargo space is separated into a plurality of zones or areas 12, 14 that can optionally be maintained at different temperatures. Center partition panels 16 extend along the long axis of the trailer and separate the trailer into a left zone 12 and a right zone 14. The partition panels 16 can have various interfitting modular constructions, as is known in the art. Lateral panels 18, 20 extend laterally from the center partitions 16 to the left and right trailer walls. The right panel 20 is mounted forward of the left panel 18, thereby decreasing the volume of the right zone 14 relative to the left zone 12. Accordingly, the volume of air in the right zone 14 that must be temperature controlled is minimized, which in turn maximizes efficiency and reduces strain on the temperature control system.

Figure 4:
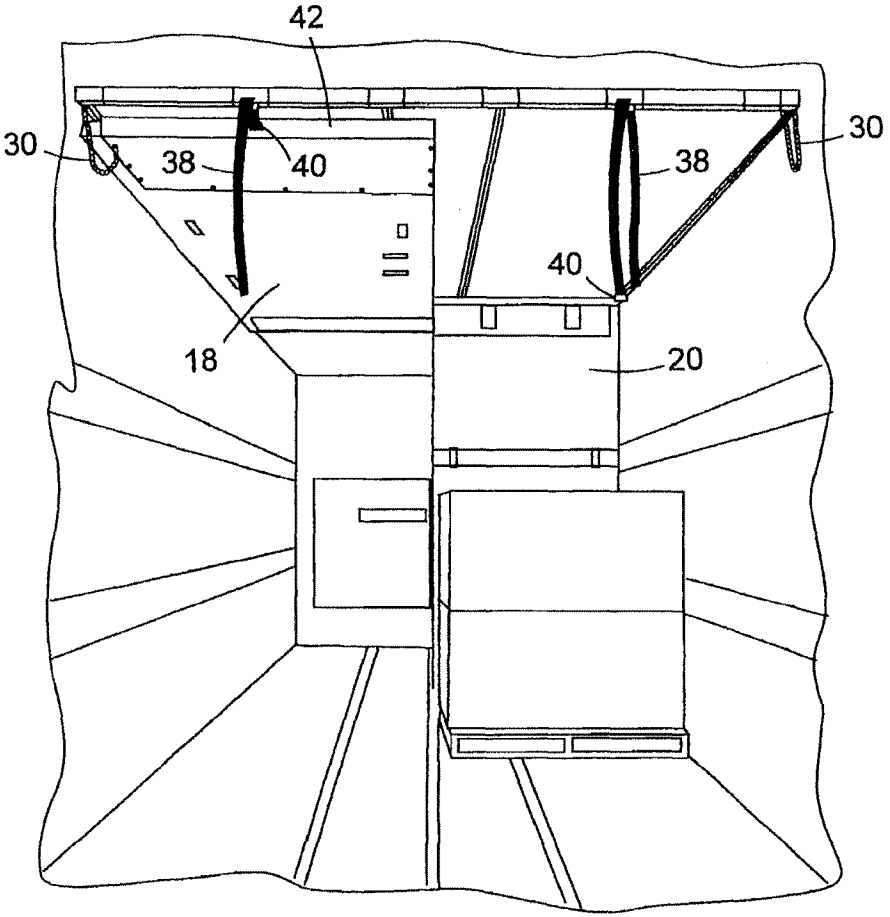
FIG. 4 is a perspective view of the rail systems, trolley assembly, and panel after the panel has been raised into a stowed position by a lift mechanism.

The panels 18, 20 are slidably attached to the rails 22, 23 with a trolley assembly 24. The panels are hingedly attached to trolley assembly 24, and the trolley assemblies are slidably attached to the rails 22, 23. The trolley assemblies permit the panels 18, 20 to be moved in the fore and aft direction and to be "raised" like garage doors and secured to the ceiling when not in use, as shown in FIG. 4 and described in more detail below.

Those skilled in the art will appreciate that the panel, trolley assembly, and rail system can be implemented in a wide variety of configurations. For instance, the rails may be advantageously installed on the side walls of the trailer, thereby enabling the panels 18, 20 to open like a standard household door. The mounting assembly is preferably a trolley assembly, but may optionally be replaced with any mechanism that permits rotational, slideable, or hinged movement between the rails and the bulkhead. It is not necessary that the trolley or other mounting assembly permit continuous slidable movement of the bulkhead relative to the rails. Similarly, the rails may be replaced with other receiving members that cooperate with the selected mounting means. It is not necessary that the receiving means be unitary, continuous, or disposed along the long axis of the trailer. For instance, the receiving means can be a series of individual receptacles disposed along the ceiling of the trailer.

Figure 2:
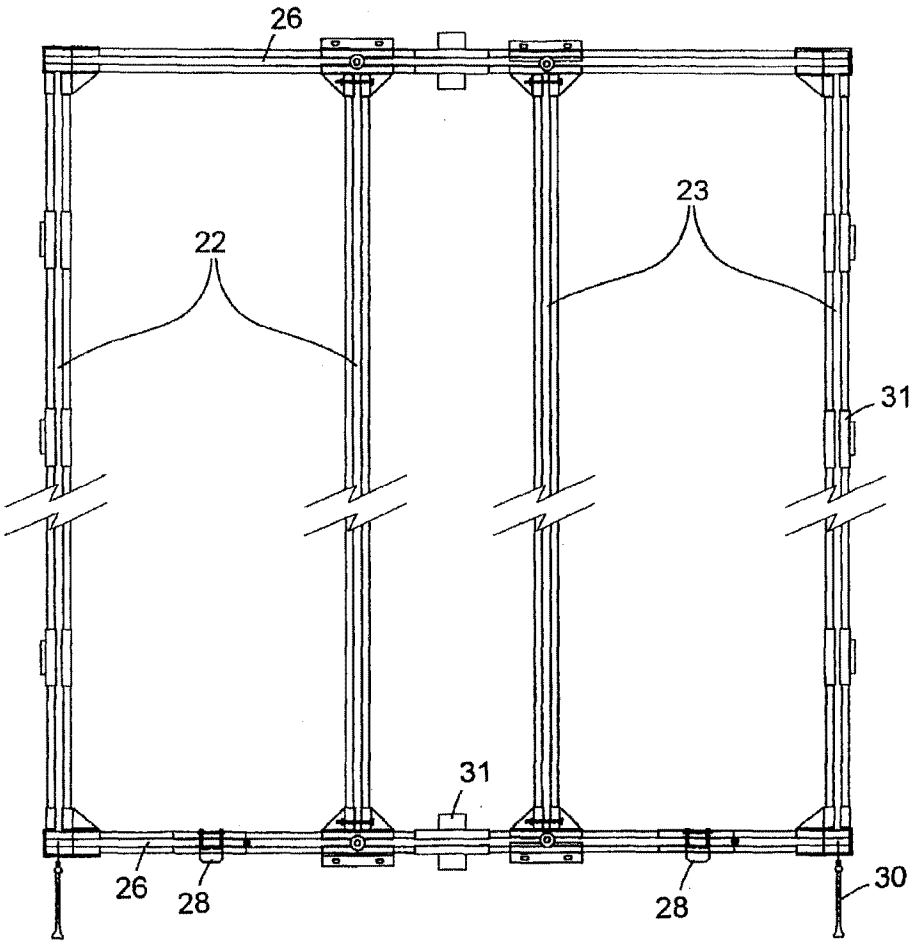
FIG. 2 is a plan view of rail system shown in FIG. 1.

FIG. 2 is a plan view of the rail assembly shown in FIG. 1. In the depicted embodiment, the receiving members comprise longitudinal rails 22, 23 having an internal channel adapted to receive a slidable member, preferably a roller. End rails 26 provide a mount for the ends of the longitudinal rails 22, 23 and also function as a trolley stop. Fixed to the end rails 26 are lift mechanisms 28 and safety chains 30, the functionality of which is described below. Mounting flanges 31 permit the rails to be fastened to the trailer walls or ceiling with standard fasteners.

Here again, various modifications can be readily made without departing from the invention. For instance, end rails 26 can be replaced with end caps or can be omitted entirely. The end rails 26 can also be advantageously replaced with half-width movable rails that span and slidably engage the two longitudinal rails on the left 22 and the two longitudinal rails on the right 23, respectively. Each moveable rail can be fitted with lift mechanisms 28 and safety chains 30 such that each moveable rail can be slid into position relative to each panel before each is lifted into an inoperative or stowed position. Additional longitudinal rails 22, 23 can be added to accommodate additional panels or panels of different widths.

Figure 3:
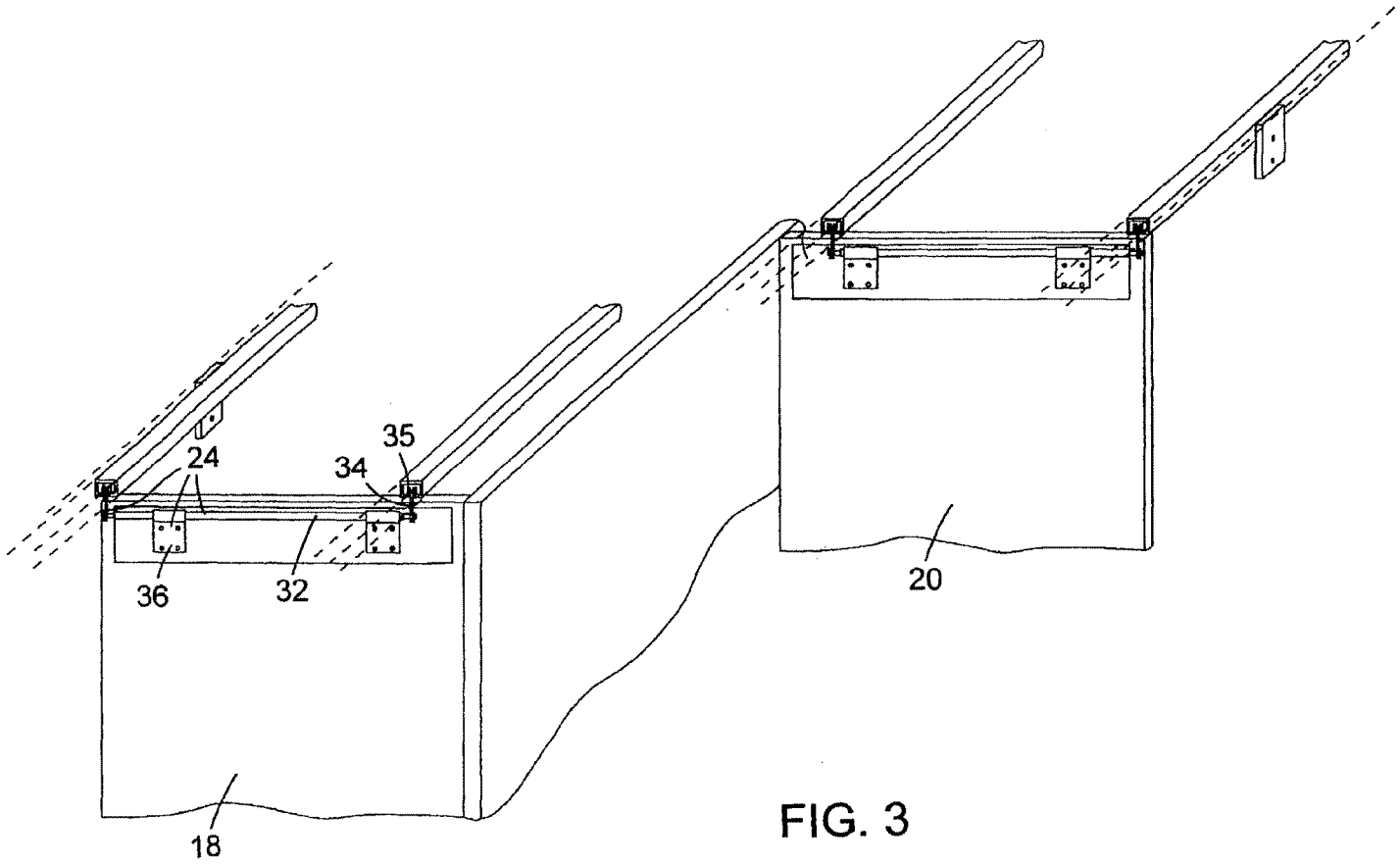
FIG. 3 is a perspective view of a rail system, trolley assembly slideably attached to the rail system, and a panel hingedly attached to the rail system.

FIG. 3 is a perspective view of the panels 18, 20, the trolley assembly 24, and the rails 22, 23. The trolley assembly consists of hinge plates 36 that are fixedly secured to the panels 18, 20, a hinge rod 32, and trolleys 34. The trolleys 34 serve to suspend the panel from the rails 22. Trolleys 34 include rollers 35 which permit the bulkhead to be slid into a desired longitudinal position, as shown in FIG. 1. The hinge mechanism 32, 36 permits the panel to rotate about the hinge rod 32, as shown in FIG. 4.

The panel is moved from the position shown in FIG. 3 to the position shown in FIG. 4 by lifting the bottom of the panel 18 up and to the rear of the trailer. The panel 18 is moved fore or aft, as needed, to position the base of the panel 18 proximate to the strap 38 having a hook 40. The hook 40 is secured to the base 42 of panel 18, preferably by attachment to a cooperating receptacle. The strap 38 is pulled downward to raise the base 42 of the panel to the ceiling of the trailer. The chains 30 can be attached to the base 42 of the panel 18 to safeguard against unintended release of the panel 18 from the stowed position.

Referring to FIGS. 3 and 4, the assemblies may be advantageously modified to provide additional or different functionalities. The trolley assembly [32, 34, 36] *24* can optionally be replaced with any known mounting mechanism that cooperates with the rails. The mounting means may comprise a post or flange integrally molded into the panel 18 and adapted to be received into the rails 22. As further examples, the mounting means may include i) a flat slidable member that engages an interior surface of the rail member and is hingedly attached to the bulkhead, ii) an integral, one piece, arcuate tab attached to the top of the bulkhead that can be inserted into one of a plurality of longitudinally arranged receiving means at a predetermined angle such that the tab locks the bulkhead into place as the bulkhead is lowered into a vertical position, iii) a hinge member that releasably locks into one of a plurality of longitudinally disposed receiving means, or iv) any other known mounting mechanism suitable for such mechanical attachment. Likewise, rails 22, 23 can be replaced with other mechanisms that cooperate with the selected mounting mechanism. For example, the rails 22, 23 may be replaced with a continuous rail having a plurality of axially disposed apertures for receiving cooperatively configured mounting means or a series of independently mounted receiving members for receiving cooperatively configured mounting means. As noted above, the rail members can optionally be mounted on a vertical surface, such as a trailer wall. Mounting members can thus be selected to enable the bulkheads to swing open like a door, slide in the axial direction in which the rail members are mounted, or be readily removed and reinstalled in another set of receiving members. The foregoing modifications are illustrative only and are not intended to comprise a comprehensive list of all modifications that can be made to the instant apparatus without departing from the invention.

Figure 5:
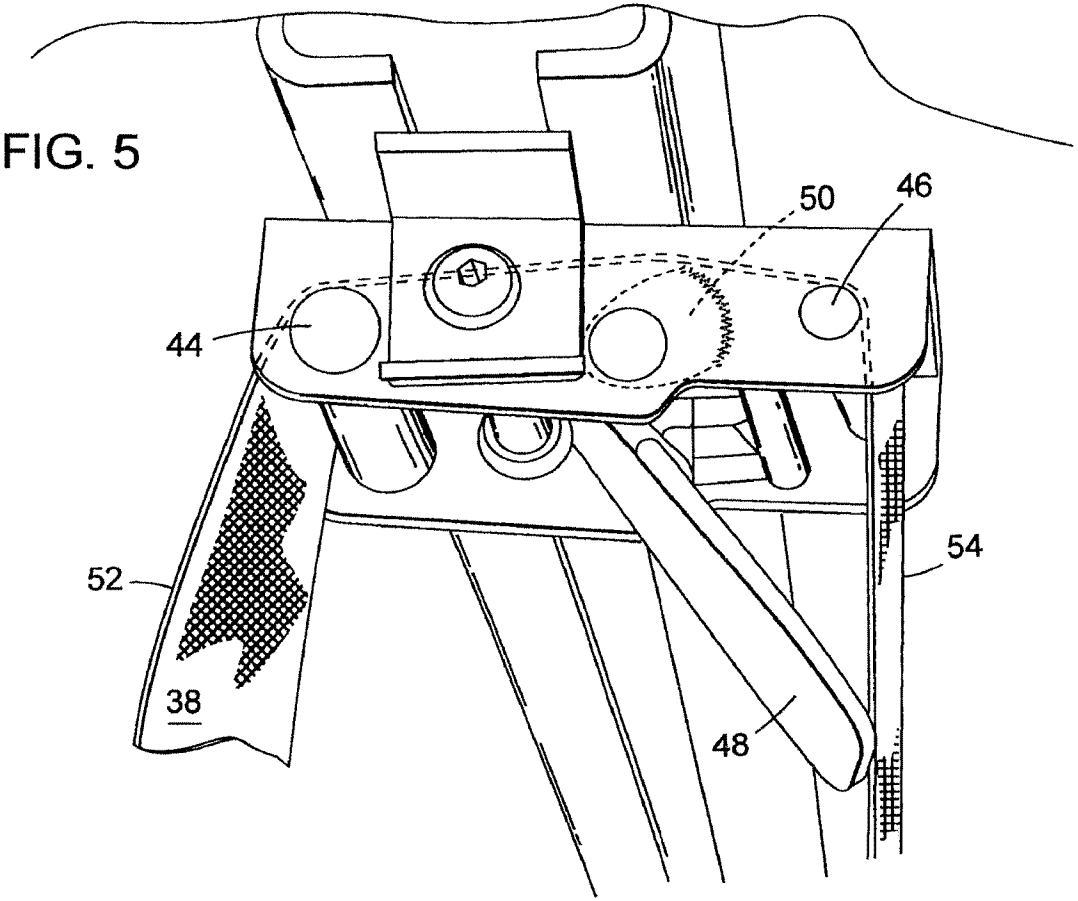
FIG. 5 is a perspective view of a lift mechanism.

FIG. 5 is a detailed view of the strap 38 and cooperating locking mechanism shown in FIG. 4. The strap 38 is positioned over guide pins 44, 46. Flange 48 is rigidly attached to cam 50. In use, the left portion 52 of the strap 38 is attached to the base 42 of the panel 18 either directly or through a suitable cooperating attachment means such as a hook and a mateable receptacle. The right portion 54 of the strap 38 is pulled downward until the panel 18 is in the desired stowage position. Then the flange 48 is forced upward by action of a spring (not shown), thereby forcing cam 50 against strap 38 and locking the strap in place. To lower the bulkhead 18, the right portion 54 of the strap 38 is pulled downward, which in turn forces flange 48 downward to the depicted, open position. The strap is then free to travel over guide pins 44, 46 as long as the right portion of the strap is maintained in the depicted, vertical position in substantial tension, which holds flange 48 in the open position. When the end of the strap portion 54 is raised upwards and to the rear of the trailer, spring force causes the flange and cam assembly to rotate counterclockwise, causing the cam 50 to lock the strap 38 in place. Accordingly, the base 42 of the bulkhead 18 is lowered toward the floor of the trailer by holding the strap portion 54 in a vertical position as the strap is pulled over pins 44, 46 by the weight of the bulkhead.

Figure 6:
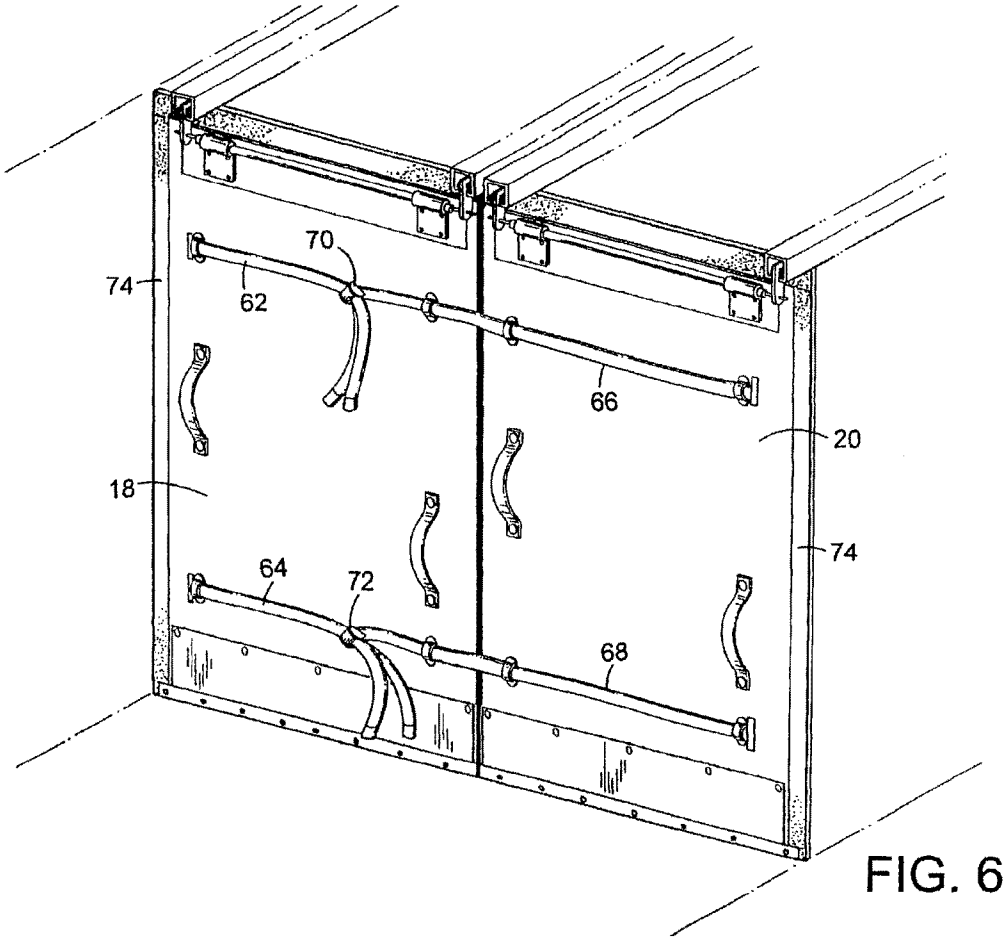
FIG. 6 is a perspective view of two panels placed side-by-side to make a full-width bulkhead.

The panels 18 and 20 may be advantageously used without center partition panels 16, as illustrated in FIG. 6. The panels 18 and 20 may be placed side-by-side and fastened together to make a full-width bulkhead. The panels 18 and 20 may be secured relative to one another with a variety of known means. In this implementation, the panels 18 and 20 are secured by straps 62, 64, 66, and 68, and buckles 70 and 72. Alternatively, the panels can be secured with cooperating channels, grooves, flanges, polymeric seals, locking pins, or the like. The panels 18 and 20 may also be equipped with coated nylon seals 74 along the peripheral edges to enhance the seal between the panels 18 and 20 when fastened together.

Figure 7:
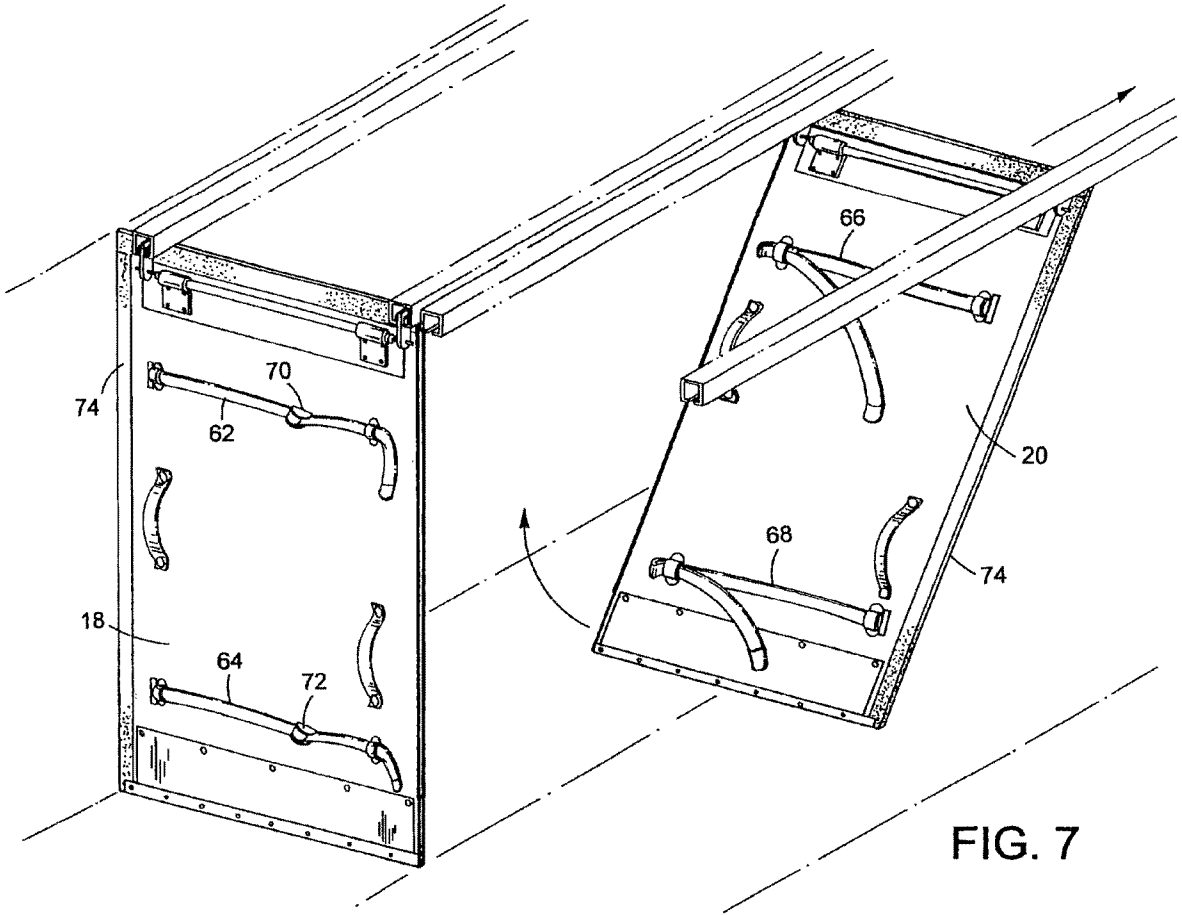
FIG. 7 is a perspective view of the panel shown in FIG. 6 being raised and moved independently.

FIG. 7 illustrates how a user can advantageously separate the panels 18 and 20 by releasing straps 66 and 68 from buckles 70 and 72. The top one of either panel 18 or 20 can be slid forward as the bottom is raised rearwardly (indicated by the arrows) permitting the panel to be lifted and stowed even when pallets and cargo are stacked close to the panel.

A number of embodiments of the present invention have been described. Nevertheless, it will be understood that various additional modifications may be made without departing from the spirit and scope of the invention. Accordingly, other embodiments are within the scope of the following claims.

What is claimed is:

[1. An apparatus for separating spaces in a cargo trailer, comprising:

first and second half-width bulkhead panels that are mountable in an interior space of the trailer, wherein when the panels are mounted in the trailer, the first and second half-width bulkhead panels are releasably securable together in a side-by-side abutting configuration to form a full-width bulkhead that extends between opposing sidewalls of the trailer;

a plurality of straps and buckles arranged on rearward faces of the first and second half-width bulkhead panels so as to releasably secure the first and second panels together in the side-by-side abutting configuration when the panels are mounted in the trailer, the plurality of straps and buckles including at least one upper strap that engages an upper buckle and at least one lower strap that engages a lower buckle; and a mounting system to movably support the first and second half-width bulkhead panels in the trailer, the mounting system attachable to at least one of a wall or a ceiling of the trailer, wherein when the panels are mounted in the trailer, the mounting system provides each of the first and second half-width bulkhead panels with a first degree of freedom to convey the panels in a longitudinal direction independently of one another and that provides each of the first and second panels with a second degree of freedom to raise the panels independently.]

[2. The apparatus of claim 1, wherein when the first and second half-width bulkhead panels are releasably secured together in the side-by-side abutting configuration, the panels seal together along adjacent peripheral edges of the panels to define the full-width bulkhead.]

[3. The apparatus of claim 2, wherein the first and second panels comprise seal members arranged along the adjacent peripheral edges so that the first and second panels seal together along the adjacent peripheral edges when the first and second panels are releasably secured together in the side-by-side abutting configuration.]

[4. The apparatus of claim 1, wherein the mounting system permits the each of the first and second panels to be hingedly raised independently.]

[5. The apparatus of claim 4, wherein when the first and second panels are mounted in the trailer in a first operative position, the first and second panels extend in a substantially vertical direction in the trailer.]

[6. The apparatus of claim 5, wherein when the panels are mounted in the trailer in a second operative position, at least one of the panels is hingedly raised to extend in a substantially non-vertical direction in the trailer.]

[7. The apparatus of claim 1, wherein the mounting system further comprises:

a first trolley assembly engageable with a first set of two longitudinal rails mountable in the trailer, wherein the first panel is attachable to the first set of two longitudinal rails by the first trolley assembly, a second trolley assembly engageable with a second set of two longitudinal rails mountable in the trailer, wherein the second panel is attachable to the second set of two longitudinal rails by the second trolley assembly, and an end rail mountable proximate to rear ends of the first and second sets of longitudinal rails along the ceiling of the trailer to extend generally laterally between opposing sidewalls of the trailer.]

[8. The apparatus of claim 7, further comprising:

a first lift mechanism to raise a lower edge of the first panel toward the ceiling when the first and second panels are mounted in the trailer, at least a portion of the first lift mechanism being mountable to the end rail when the end rail is mounted along the ceiling of the trailer, the first lift mechanism being engageable with a first strap or rope that is coupled proximate to the lower edge of the first panel so as to raise the lower edge of the first panel when the first strap or rope is manually pulled, and a second lift mechanism to raise a lower edge of the second panel toward the ceiling when the first and second panels are mounted in the trailer, at least a portion of the second lift mechanism being mountable to the end rail when the end rail is mounted along the ceiling of the trailer, the second lift mechanism being engageable with a second strap or rope that is coupled proximate to the lower edge of the second panel so as to raise the lower edge of the second panel when the second strap or rope is manually pulled.]

[9. The apparatus of claim 7:

wherein the first trolley assembly comprises two trolleys movably mountable to the first set of two longitudinal rails, a hinge rod extending between the two trolleys, and hinge plates that engage the hinge rod and are attachable to the first panel, and wherein the second trolley assembly comprises two trolleys movably mountable to the second set of two longitudinal rails, a hinge rod extending between the two trolleys of the second trolley assembly, and hinge plates that engage the hinge rod of the second trolley assembly and are attachable to the second panel.]

[10. The apparatus of claim 1, further comprising:

a first lift mechanism to raise the first panel to a stowed position proximate the ceiling when the first and second panels are mounted in the trailer, the first lift mechanism comprising a movable cam to engage a first strap or rope coupled to the first panel, and a second lift mechanism to raise the second panel to a stowed position proximate the ceiling when the first and second panels are mounted in the trailer, the second lift mechanism comprising a movable cam to engage a second strap or rope coupled to the second panel.]

[11. The apparatus of claim 10, further comprising a first safety restraint attachable between the mounting system and the first panel to secure the first panel is in its stowed position when the first and second panels are mounted in the trailer, the first safety restraint being different from the first lift mechanism.]

[12. The apparatus of claim 11, wherein the first safety restraint comprises a safety chain mountable to at least one rail of the mounting system.]

[13. The apparatus of claim 11, further comprising a second safety restraint attachable between the mounting system and the second panel to secure the second panel is in its stowed position when the first and second panels are mounted in the trailer, the second safety restraint being different from the second lift mechanism.]

[14. The apparatus of claim 13, wherein the second safety restraint comprises a safety chain mountable to at least one rail of the mounting system.]

[15. The apparatus of claim 10, wherein the movable cam of the first lift mechanism is adjustable to lock the first strap or rope in a fixed position to thereby secure the first panel in its stowed position when the first and second panels are mounted in the trailer.]

[16. The apparatus of claim 1, wherein when the first and second half-width bulkhead panels are mounted in the trailer, an upper edge of the first half-width bulkhead panel is movable forwardly in the trailer as a lower edge of the first half-width bulkhead panel is hingedly moved rearwardly in the trailer.]

[17. The apparatus of claim 8, further comprising a first safety restraint attachable between the mounting system and the first panel to secure the first panel is in a stowed position proximate to the end rail when the first and second panels are mounted in the trailer, the first safety restraint being different from the first lift mechanism.]

[18. The apparatus of claim 17, wherein the first safety restraint comprises a safety chain mountable to at least one rail of the mounting system.]

[19. The apparatus of claim 17, further comprising a second safety restraint attachable between the mounting system and the second panel to secure the second panel is in a stowed position proximate to the end rail when the first and second panels are mounted in the trailer, the second safety restraint being different from the second lift mechanism.]

[20. The apparatus of claim 19, wherein the second safety restraint comprises a safety chain mountable to at least one rail of the mounting system.]

*21. An apparatus for separating spaces in a cargo trailer, comprising:*

*first and second half-width bulkhead panels that are mountable in an interior space of the trailer, wherein when the panels are mounted in the trailer, the first and second half-width bulkhead panels are releasably securable together in a side-by-side abutting configuration to form a full-width bulkhead that extends between opposing sidewalls of the trailer; and*

*a mounting system to movably support the first and second half-width bulkhead panels in the trailer, the mounting system attachable to at least one of a wall or a ceiling of the trailer, wherein when the panels are mounted in the trailer, the mounting system provides each of the first and second half-width bulkhead panels with a first degree of freedom to convey the panels in a longitudinal direction independently of one another and that provides each of the first and second panels with a second degree of freedom to raise the panels independently, the mounting system comprising*

*a first longitudinal rail assembly comprising at least a first longitudinal rail and a second longitudinal rail assembly comprising at least a second longitudinal rail, wherein the first longitudinal rail assembly and the second longitudinal rail assembly are mountable in the trailer,*

*an end rail mountable proximate to rear ends of the first longitudinal rail and the second longitudinal rail along the ceiling of the trailer to extend generally laterally between opposing sidewalls of the trailer, and*

*a first lift mechanism to raise a lower edge of the first panel to a stowed position proximate the ceiling when the first and second panels are mounted in the trailer, at least a portion of the first lift mechanism being mountable to the end rail when the end rail is mounted along the ceiling of the trailer, and a second lift mechanism to raise a lower edge of the second panel to a stowed position proximate the ceiling when the first and second panels are mounted in the trailer, at least a portion of the second lift mechanism being mountable to the end rail when the end rail is mounted along the ceiling of the trailer.*

*22. The apparatus of claim 21, wherein when the first and second half-width bulkhead panels are releasably secured together in the side-by-side abutting configuration, the panels seal together along adjacent peripheral edges of the panels to define the full-width bulkhead.*

*23. The apparatus of claim 22, wherein the first and second half-width bulkhead panels comprise seal members arranged along the adjacent peripheral edges so that the first and second panels seal together along the adjacent peripheral edges when the first and second panels are releasably secured together in the side-by-side abutting configuration.*

*24. The apparatus of claim 21, wherein the mounting system permits each of the first and second half-width bulkhead panels to be hingedly raised independently.*

*25. The apparatus of claim 24, wherein when the first and second half-width bulkhead panels are mounted in the*

*trailer in a first operative position, the first and second panels extend in a substantially vertical direction in the trailer.*

*26. The apparatus of claim 25, wherein when the panels are mounted in the trailer in a second operative position, at least one of the panels is hingedly raised to extend in a substantially non-vertical direction in the trailer.*

*27. The apparatus of claim 21, wherein the mounting system further comprises: a first trolley assembly engageable with the first longitudinal rail assembly, wherein the first half-width bulkhead panel is attachable to the first longitudinal rail assembly by the first trolley assembly; and a second trolley assembly engageable with the second longitudinal rail assembly, wherein the second half-width bulkhead panel is attachable to the second longitudinal rail assembly by the second trolley assembly.*

*28. The apparatus of claim 27, wherein the first trolley assembly comprises two trolleys movably mountable to the first longitudinal rail assembly, a first hinge rod extending between the two trolleys, and first hinge plates that engage the first hinge rod and are attachable to the first panel, and wherein the second trolley assembly comprises two trolleys movably mountable to the second longitudinal rail assembly, a second hinge rod extending between the two trolleys of the second trolley assembly, and second hinge plates that engage the second hinge rod of the second trolley assembly and are attachable to the second panel.*

*29. The apparatus of claim 21, further comprising a first safety restraint attachable between the mounting system and the first half-width bulkhead panel to secure the first half-width bulkhead panel in its stowed position when the first and second half-width bulkhead panels are mounted in the trailer, the first safety restraint being different from the first lift mechanism.*

*30. The apparatus of claim 29, wherein the first safety restraint comprises a safety chain mountable to at least one rail of the mounting system.*

*31. The apparatus of claim 29, further comprising a second safety restraint attachable between the mounting system and the second half-width bulkhead panel to secure the second panel in its stowed position when the first and second panels are mounted in the trailer, the second safety restraint being different from the second lift mechanism.*

*32. The apparatus of claim 31, wherein the second safety restraint comprises a safety chain mountable to at least one rail of the mounting system.*

*33. The apparatus of claim 21, wherein the first lift mechanism comprises a first movable cam to engage a first strap or rope coupled to the first half-width bulkhead panel, and the second lift mechanism comprises a second movable cam to engage a second strap or rope coupled to the second half-width bulkhead panel.*

*34. The apparatus of claim 33, wherein the movable cam of the first lift mechanism is adjustable to lock the first strap or rope in a fixed position to thereby secure the first half-width bulkhead panel in its stowed position when the first and second panels are mounted in the trailer.*

*35. The apparatus of claim 21, wherein when the first and second half-width bulkhead panels are mounted in the trailer, an upper edge of the first half-width bulkhead panel is movable forwardly in the trailer as a lower edge of the first half width bulkhead panel is hingedly moved rearwardly in the trailer.*

*36. The apparatus of claim 21, further comprising a plurality of straps and buckles arranged on rearward faces of the first and second half-width bulkhead panels so as to releasably secure the first and second panels together in the side-by side abutting configuration when the panels are mounted in the trailer, the plurality of straps and buckles including at least one upper strap that engages an upper buckle and at least one lower strap that engages a lower buckle.*

*37. An apparatus for separating spaces in a cargo trailer, comprising:*

*first and second half-width bulkhead panels that are mountable in an interior space of the trailer, wherein when the panels are mounted in the trailer, the first and second half-width bulkhead panels are releasably securable together in a side-by-side abutting configuration to form a full-width bulkhead that extends between opposing sidewalls of the trailer;*

*a plurality of straps and buckles arranged on rearward faces of the first and second half-width bulkhead panels so as to releasably secure the first and second panels together in the side-by-side abutting configuration when the panels are mounted in the trailer, the plurality of straps and buckles including at least one upper strap that engages an upper buckle and at least one lower strap that engages a lower buckle; and*

*a mounting system to movably support the first and second half-width bulkhead panels in the trailer, the mounting system attachable to at least one of a wall or a ceiling of the trailer, wherein when the panels are mounted in the trailer, the mounting system provides each of the first and second half-width bulkhead panels with a first degree of freedom to convey the panels in a longitudinal direction independently of one another and that provides each of the first and second panels with a second degree of freedom to raise the panels independently, wherein when the first and second half-width bulkhead panels are mounted in the trailer, an upper edge of the first half-width bulkhead panel is movable forwardly in the trailer as a lower edge of the first half-width bulkhead panel is hingedly moved rearwardly in the trailer.*

*38. The apparatus of claim 37, wherein when the first and second half-width bulkhead panels are releasably secured together in the side-by-side abutting configuration, the panels seal together along adjacent peripheral edges of the panels to define the full-width bulkhead.*

*39. The apparatus of claim 38, wherein the first and second panels comprise seal members arranged along the adjacent peripheral edges so that the first and second panels seal together along the adjacent peripheral edges when the first and second panels are releasably secured together in the side-by-side abutting configuration.*

*40. The apparatus of claim 37, wherein the mounting system permits each of the first and second panels to be hingedly raised independently.*

*41. The apparatus of claim 40, wherein when the first and second panels are mounted in the trailer in a first operative position, the first and second panels extend in a substantially vertical direction in the trailer.*

*42. The apparatus of claim 41, wherein when the panels are mounted in the trailer in a second operative position, at least one of the panels is hingedly raised to extend in a substantially non-vertical direction in the trailer.*

*43. The apparatus of claim 37, wherein the mounting system further comprises: a first trolley assembly engageable with a first set of two longitudinal rails mountable in the trailer, wherein the first panel is attachable to the first set of two longitudinal rails by the first trolley assembly, a second trolley assembly engageable with a second set of two longitudinal rails mountable in the trailer, wherein the second*

*panel is attachable to the second set of two longitudinal rails by the second trolley assembly, and an end rail mountable proximate to rear ends of the first and second sets of longitudinal rails along the ceiling of the trailer to extend generally laterally between opposing sidewalls of the trailer.*

*44. The apparatus of claim 43, further comprising: a first lift mechanism to raise a lower edge of the first panel toward the ceiling when the first and second panels are mounted in the trailer, at least a portion of the first lift mechanism being mountable to the end rail when the end rail is mounted along the ceiling of the trailer, the first lift mechanism being engageable with a first strap or rope that is coupled proximate to the lower edge of the first panel so as to raise the lower edge of the first panel when the first strap or rope is manually pulled, and a second lift mechanism to raise a lower edge of the second panel toward the ceiling when the first and second panels are mounted in the trailer, at least a portion of the second lift mechanism being mountable to the end rail when the end rail is mounted along the ceiling of the trailer, the second lift mechanism being engageable with a second strap or rope that is coupled proximate to the lower edge of the second panel so as to raise the lower edge of the second panel when the second strap or rope is manually pulled.*

*45. The apparatus of claim 44, further comprising a first safety restraint attachable between the mounting system and the first panel to secure the first panel is in a stowed position proximate to the end rail when the first and second panels are mounted in the trailer, the first safety restraint being different from the first lift mechanism.*

*46. The apparatus of claim 45, wherein the first safety restraint comprises a safety chain mountable to at least one rail of the mounting system.*

*47. The apparatus of claim 45, further comprising a second safety restraint attachable between the mounting system and the second panel to secure the second panel is in a stowed position proximate to the end rail when the first and second panels are mounted in the trailer, the second safety restraint being different from the second lift mechanism.*

*48. The apparatus of claim 47, wherein the second safety restraint comprises a safety chain mountable to at least one rail of the mounting system.*

*49. The apparatus of claim 43, wherein the first trolley assembly comprises two trolleys movably mountable to the first set of two longitudinal rails, a hinge rod extending between the two trolleys, and hinge plates that engage the hinge rod and are attachable to the first panel, and wherein the second trolley assembly comprises two trolleys movably mountable to the second set of two longitudinal rails, a hinge rod extending between the two trolleys of the second trolley assembly, and hinge plates that engage the hinge rod of the second trolley assembly and are attachable to the second panel.*

*50. The apparatus of claim 37, further comprising: a first lift mechanism to raise the first panel to a stowed position proximate the ceiling when the first and second panels are mounted in the trailer, the first lift mechanism comprising a movable cam to engage a first strap or rope coupled to the first panel, and a second lift mechanism to raise the second panel to a stowed position proximate the ceiling when the first and second panels are mounted in the trailer, the second lift mechanism comprising a movable cam to engage a second strap or rope coupled to the second panel.*

*51. The apparatus of claim 50, further comprising a first safety restraint attachable between the mounting system and the first panel to secure the first panel in its stowed position when the first and second panels are mounted in the trailer, the first safety restraint being different from the first lift mechanism.*

*52. The apparatus of claim 51, wherein the first safety restraint comprises a safety chain mountable to at least one rail of the mounting system.*

*53. The apparatus of claim 51, further comprising a second safety restraint attachable between the mounting system and the second panel to secure the second panel in its stowed position when the first and second panels are mounted in the trailer, the second safety restraint being different from the second lift mechanism.*

*54. The apparatus of claim 53, wherein the second safety restraint comprises a safety chain mountable to at least one rail of the mounting system.*

*55. The apparatus of claim 50, wherein the movable cam of the first lift mechanism is adjustable to lock the first strap or rope in a fixed position to thereby secure the first panel in its stowed position when the first and second panels are mounted in the trailer.*

* * * * *